United States Patent

Takada et al.

[11] Patent Number: 5,329,454
[45] Date of Patent: Jul. 12, 1994

[54] CONSTANT SPEED MAINTAINING APPARATUS FOR VEHICLE

[75] Inventors: Masahiro Takada, Hirakata; Akira Ishida, Sakai, both of Japan

[73] Assignee: Matsushita Electric Industrial Co., Ltd., Osaka, Japan

[21] Appl. No.: 901,578

[22] Filed: Jun. 19, 1992

[30] Foreign Application Priority Data

Jun. 19, 1991 [JP] Japan ............... 3-147153
Sep. 18, 1991 [JP] Japan ............... 3-237702

[51] Int. Cl.$^5$ ............................. B60K 31/00
[52] U.S. Cl. .................. 364/426.04; 180/170; 364/431.07
[58] Field of Search ........ 364/424.1, 426.04, 431.07; 180/170

[56] References Cited

U.S. PATENT DOCUMENTS

| | | | |
|---|---|---|---|
| 4,463,822 | 8/1984 | Tanigawa et al. | 180/177 |
| 4,535,864 | 8/1985 | Tanigawa et al. | 180/177 |
| 4,535,865 | 8/1985 | Tanigawa et al. | 180/177 |
| 4,829,438 | 5/1989 | Etoh | 364/426.04 |
| 4,845,621 | 7/1989 | Kawata et al. | 364/426.04 |
| 4,879,655 | 11/1989 | Mori | 364/426.04 |
| 4,905,786 | 3/1990 | Miyake et al. | 180/179 |
| 4,926,334 | 5/1990 | Suzuki et al. | 364/426.04 |
| 4,930,084 | 5/1990 | Hosaka et al. | 364/426.04 |
| 4,931,939 | 6/1990 | Kawata et al. | 364/426.04 |
| 4,933,859 | 6/1990 | Tsuyama et al. | 364/426.04 |
| 4,938,604 | 7/1990 | Naito et al. | 364/426.04 |
| 4,984,166 | 1/1991 | Teratani et al. | 364/426.04 |
| 5,005,133 | 4/1991 | Takahashi | 364/426.04 |
| 5,010,490 | 4/1991 | Naito et al. | 364/426.04 |
| 5,129,475 | 7/1992 | Kawano et al. | 180/179 |
| 5,137,104 | 8/1992 | Etoh | 180/179 |
| 5,155,682 | 10/1992 | Ninoyu | 364/424.1 |
| 5,162,998 | 11/1992 | Kondo | 364/426.04 |
| 5,177,682 | 1/1993 | Oo et al. | 364/426.04 |
| 5,177,683 | 1/1993 | Oo et al. | 364/426.04 |
| 5,189,618 | 2/1993 | Tsujii et al. | 364/426.04 |

FOREIGN PATENT DOCUMENTS

0467353A1 4/1991 European Pat. Off. .
0430028A2 6/1991 European Pat. Off. .

OTHER PUBLICATIONS

"Model Reference Control Using Time Delay for Nonlinear Plants with Unknown Dynamics", Youcef-Toumi et al., pp. 380–387, no date.

Primary Examiner—Thomas G. Black
Assistant Examiner—Susan Wieland
Attorney, Agent, or Firm—Wenderoth, Lind & Ponack

[57] ABSTRACT

A constant speed maintaining apparatus for use in a vehicle includes a vehicle speed detector for detecting a present speed $\dot{V}(t)$ of the vehicle, a cruise control device for producing a control value $U(t)$, a target speed setting device for setting a target speed $Vd(t)$, and an actuator for changing the opening degree of a throttle valve of a vehicle engine based on the control value $U(t)$ to maintain the present speed $V(t)$ substantially equal to the target speed $Vd(t)$. The cruise control device includes a differentiation device for calculating a differentiated present speed $\dot{V}(t)$, a parameter estimation device for calculating an estimated parameter $b_{est}$ based on the present speed $V(t)$, differentiated present speed $\dot{V}(t)$, and control value $U(t)$, and a control value calculation device for calculating the control value based on the target speed $Vd(t)$, present speed $V(t)$, differentiated present speed $\dot{V}(t)$, and estimated parameter $b_{est}$.

12 Claims, 6 Drawing Sheets

CONSTANT SPEED MAINTAINING APPARATUS FOR VEHICLE

BACKGROUND OF THE INVENTION

1. Field of the Invention

The present invention relates to a constant speed maintaining apparatus for use in a vehicle for automatically controlling the degree of throttle opening to maintain the vehicle speed substantially constant to the target speed, even when the vehicle is running on an up slope road or down slope road.

2. Description of the Prior Art

In a controlling apparatus to keep a constant speed of a vehicle, various kinds of controlling rules have conventionally been employed to secure the robust quality of an object to be controlled such as an engine, a vehicle body or the like of the vehicle with respect to the change of its dynamic characteristic with time. Such a controlling apparatus as above is provided with a vehicle speed detecting device for detecting the actual and present speed of the vehicle, a cruise control device for producing a control value, a target speed setting device for setting a driver's desired speed, providing an enable or disable signal to the cruise control device and increasing or decreasing the target speed, and an actuator for changing the opening degree of a throttle valve of an engine based on the control value.

The cruise control device detects the speed difference between the actual speed and the target speed and produces the control value to the actuator to change the opening degree of the throttle valve using a preselected feedback gain, thereby maintaining the vehicle speed to the target speed.

The prior art constant speed maintaining device may have a gear change control device for changing the gear when the detected speed difference becomes greater than a predetermined value, as often happens when the vehicle is running along a slope.

The prior art constant speed maintaining device is disclosed, for example, in U.S. patent application Ser. No. 07/733,208 of Ishida et al entitled "Auto-Drive Control Apparatus for Use in Vehicle" and filed Jul. 19, 1991 which is assigned to the same assignee as the present application or in Japanese Patent Laid-open Publication 57-196317 which corresponds to U.S. Pat. No. 4,463,822, U.S. Pat. No. 4,535,864 and U.S. Pat. No. 4,535,865 all of Tanigawa et al.

According to the prior art constant speed maintaining device, since the feedback gain is preselected for each vehicle, it is necessary, before the installation of the constant speed maintaining device in a vehicle, to adjust the constant speed maintaining device based on various factors, such as engine characteristics, displacement volume, reduction ratio, weight, aerial resistance, etc. Therefore, it takes a considerably long time and cost to tune the device for each vehicle to obtain the optimum controlling efficiency.

Furthermore, according to the prior art constant speed maintaining device which employs the proportional integral differential (PID) control or constant parameter control, the control system itself does not change even when the characteristics of the object to be controlled should change, such as when the vehicle is running on an up slope road or down slope road. Therefore, it is difficult to maintain the constant speed of the vehicle with as little deviation as possible.

Furthermore, when the set button or resume button of the cruise control is depressed, the vehicle speed is temporarily reduced due to the loosening or play of the wire of a throttle mechanism. Also, unwanted overshoot characteristics of the vehicle speed may be produced. Because of such defects, in the prior art constant speed maintaining device, it is difficult to quickly acquire the target speed and it is difficult to remove unwanted overshoot characteristics of the vehicle speed, resulting in uncomfortable riding.

Also, with respect to the vehicle equipped with an automatic transmission, the cruise control device produces an overdrive OFF signal when the speed difference becomes greater than a predetermined amount, such as when driving on an up slope road. In such a case, the gear is shifted down automatically from the overdrive gear to the top gear (which has a gear ratio greater than that of the overdrive gear) so as to increase the driving torque. According to the prior art constant speed maintaining device, since the overdrive OFF signal is automatically changed to overdrive ON signal after a predetermined set time, there is such a disadvantage that, when the up slope road is very long, the gear is shifted up to the overdrive gear midway through the up slope road, resulting in production of overdrive ON and OFF signals. Also, when the up slope road is very short, the gear may not be shifted up to the overdrive gear even after the up slope road.

SUMMARY OF THE INVENTION

The object of the present invention is therefore to provide a constant speed maintaining apparatus for a vehicle, with a view to substantially solving the above described disadvantages inherent in the prior art.

In order to achieve the aforementioned object, a constant speed maintaining apparatus according to the present invention comprises a vehicle speed detecting device for detecting the actual and present speed $V(t)$ of the vehicle, a cruise control device for producing a control value $U(t)$, a target speed setting device for setting a target speed $Vd(t)$, providing an enable or disable signal to the cruise control device and increasing or decreasing the target speed, an actuator for changing the opening degree of a throttle valve of an engine based on the control value $U(t)$, an actuator position detector which detects the current position of the actuator.

The cruise control device outputs a driving signal to the actuator based on the actual speed $V(t)$, target speed $Vd(t)$ and the current position of the actuator. The cruise control device includes a target speed generating device which outputs a target speed $Vd(t)$ of the vehicle, and a calculation device which calculates a control value $U(t)$ from the output of the target speed generating device and from a delayed control value $U(t-L)$.

An adaptive control, such as a time delay control, is applied to calculate the control value $U(t)$. To this end, the object to be controlled of the one-input one-output engine is expressed by an equation $V(s)/U(s) = b/(s^n + a_{n-1}s^{n-1} + \ldots + a_0)$ (wherein s is a Laplacean operator and n is a natural number). From this equation, $U(t)$ is obtained by the following equation:

$$U(t) = U(t-L) + \{-d^n V(t-L)/dt^n + d^n V_d(t)/dt^{n-1} \\ k_{n-1} \cdot d^{n-1} E(t)/dt^{n-1} + \ldots + k_0 \cdot E(t)\}/b_{est}$$

wherein $E(t)$ is a deviation defined by $E(t) = Vd(t) - V(t)$, $k_i (> 0, i = n-1 \sim 0)$ is a deviation feedback coefficient, $d^n E(t)/dt^n = -k_{n-1} \cdot d^{n-1} E(t)/dt^{n-1} \ldots -k_0 \cdot E(t)$ is a target deviation characteristic and $b_{est}$ is an estimated parameter representing a control input characteristic.

A plant parameter estimation unit is provided which calculates parameters $b_{est}$ and $a_{n-1} \sim a_0$ by n simultaneous equations from the previous vehicle speeds at n time points and first to n-th order differential values of the speeds and the above control input.

Preferably, the previous speeds at the n time points and first to n-th order differential values of the speeds and the control value are used for the estimation of the input characteristic b only when an absolute value of an n-th order differential value of the vehicle speed is larger than a predetermined value. When the vehicle speed at the setting time or resuming time is $V_0$, an initial control input $U(0)$ is given to be equal to $V_0 \cdot a_0/b_{est}$, which is obtained by using $V_0$ and coefficients $a_0$ and $b_{est}$ of the control plant.

The controller is further provided with a gear shift instructing device which instructs ON and OFF of the overdrive, and an automatic transmission to switch ON and OFF the overdrive in accordance with an command signal from the gear change command device, wherein the ON and OFF timing of the overdrive is determined based on the size of the estimated parameter $be_{est}$ of the input characteristic b and the speed difference $E(t)$.

The above gear shift instructing device turns the overdrive off when the speed difference $E(t)$ is changed not smaller than a predetermined value and the estimated value $be_{est}$ of the input characteristic b becomes not larger than a predetermined value, whereas turning on the overdrive when the speed difference is smaller than the predetermined value and the $b_{est}$ is not smaller than the predetermined value.

According to the present invention, in operating the controlling amount of the actuator so as to make the actual speed agree with the target speed, if the input distribution characteristic b is unknown and different from the control input characteristic $b_{est}$ of the object to be controlled in the one-input one-output engine able to be represented by $V(s)/U(s) = b/(s^n + a_{n-1} \cdot s^{n-1} + \ldots + a_0)$ (s is a Laplacean operator and n is a natural number), the parameters of the input characteristics b and $a_{n-1} \sim a_0$ are estimated from the vehicle speeds at the previous n time points, first to n-th order differential values of the vehicle speeds and the above control value, thereby to agree the estimated value of the input characteristic b with $b_{est}$. Accordingly, an overshoot of the vehicle speed is prevented, or the opening degree of the throttle is prevented from being excessively changed. Moreover, in comparison with the case where $b_{est}$ is a fixed value, the riding feeling is improved remarkably. The target speed can be favorably achieved.

When the parameters of input characteristics b and $a_{n-1} \sim a_0$ are obtained as a solution of n simultaneous equations by estimating the input characteristic b only when the absolute value of the n-th order differential value of the vehicle speed is larger than the predetermined value, the calculating error of b is prevented from being too large if the vehicle speed $V(t)$ and control input $U(t)$ are changed too little, so that the estimation accuracy of b is improved. In consequence, the vehicle speed is prevented from overshooting, and the opening degree of the throttle is prevented from being changed excessively. The vehicle speed can be favorably made coincident with the target speed.

The opening degree of the throttle is estimated to be $V_0 \cdot a_0/b$ with using $V_0$, which is the vehicle speed at the setting or resuming of the cruise control and coefficients $a_0$ and $b_{est}$ of the control plant. Therefore, as the initial control input $U(0)$ is set to $V_0 \cdot a_0/b_{est}$, the actuator can be quickly activated immediately after the speed is set or resumed until the desired opening degree of the throttle is acquired. The temporary deceleration resulting from the loosening or play of the wire of the throttle when the accelerator is manipulated by the actuator is hence avoided, and the vehicle speed smoothly attains the target speed at the setting time or resuming time.

The on and off timing of the overdrive is determined from the size of the estimated $b_{est}$ representing a parameter of the input characteristic b and the speed difference by the gear change command device and automatic transmission in the controller. The overdrive is accordingly turned on or off corresponding to the slope of the running road.

If the speed deviation is changed a predetermined value or more and the estimated $b_{est}$ of the input characteristic b is not larger than a predetermined value, the gear change command device turns off the overdrive. On the other hand, when the speed difference is smaller than the predetermined value and $b_{est}$ is not smaller than the predetermined value, the overdrive is turned on by the gear change command device.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
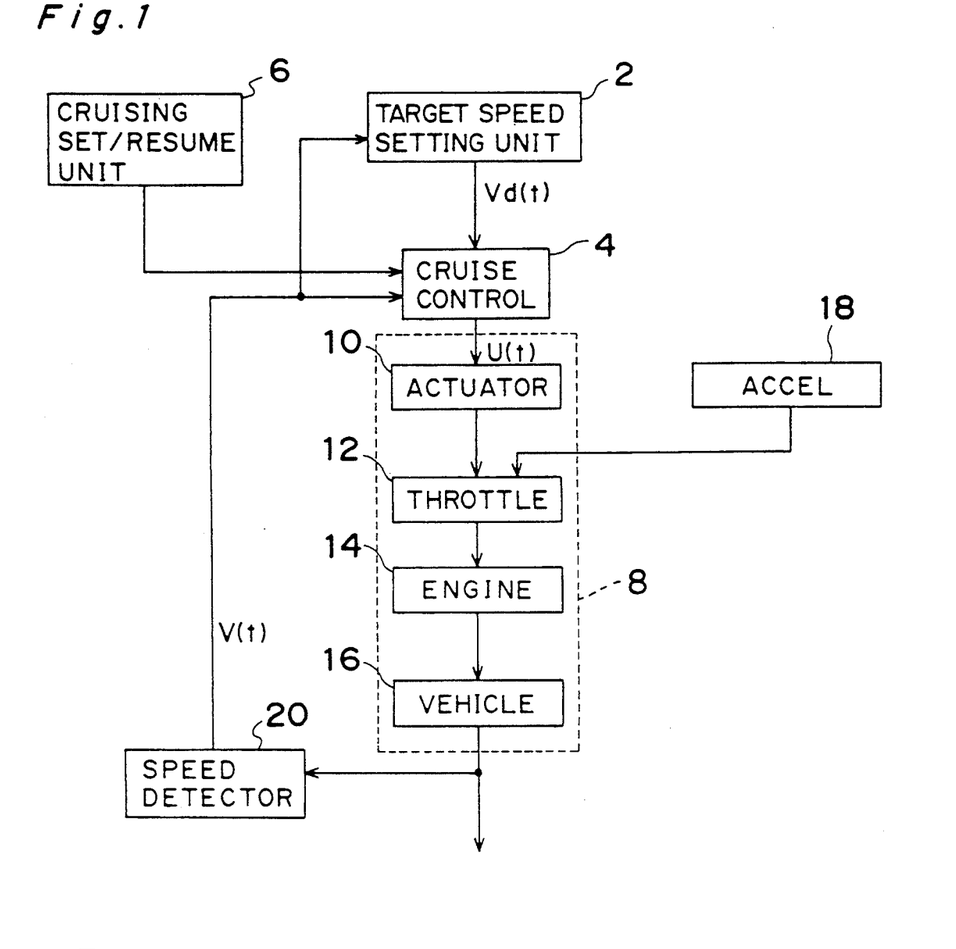
FIG. 1 is a block diagram of a constant speed maintaining apparatus according to the present invention.

Referring to FIG. 1, a constant speed maintaining apparatus for a vehicle has a target speed setting unit 2, a cruise control 4, a cruising set/resume unit 6, and a plant 8 which is the object to be controlled by the cruise control 4. The plant 8 has an actuators 10 formed, for example, by a step motor, a throttle 12, an engine 14 and a vehicle body 16 including gears and wheels. A speed detector 20 is provided in association with the vehicle body 16 to detect the present speed $V(t)$ of the vehicle, and the detected present speed $V(t)$ is applied to the cruise control 4. Also connected to the throttle 12 is an acceleration pedal 18.

Figure 2:
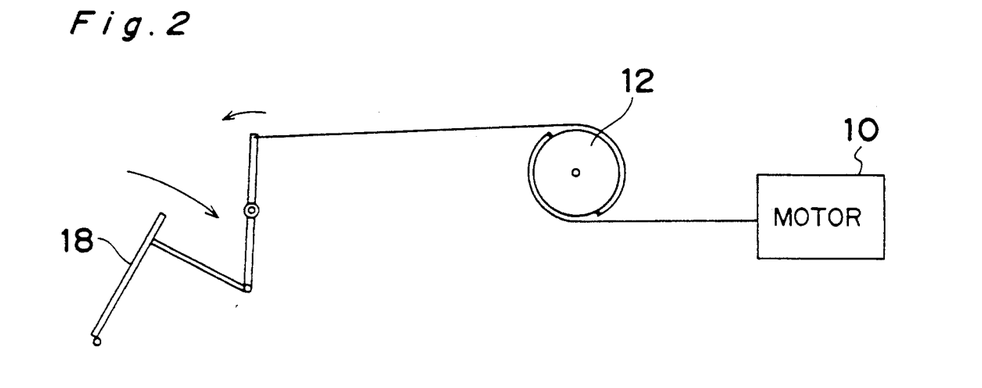
FIG. 2 is a diagrammatic view of an acceleration pedal and a motor both connected to a throttle.

As shown in FIG. 2, the throttle 12 is operated either by the acceleration pedal 18 or by the step motor or actuator 10.

When the cruise control 4 is disabled by the cruising set/resume unit 6, the actuator 10 is maintained inoperative. Thus, the throttle 12 is operated only by the acceleration pedal 18, as in the usual driving.

When the cruise control 4 is enabled by turning on the cruising set/resume unit 6 and depressing a set button (not shown), the cruising control starts such that the target speed setting unit 2 sets the present speed V(t) as the target speed Vd(t), and provides the target speed Vd(t) to the cruise control 4. At this time, the driver often removes his foot from the acceleration pedal 18. Then, the cruise control 4 compares the present speed V(t) and the target speed Vd(t). If the present speed V(t) is not equal to, such as less than, the target speed Vd(t), the cruise control 4 produces a control value U(t) to actuator 10 to further open the throttle. Thus, the actuator 10, e.g., the step motor, is operated to turn the throttle 12 by an amount determined by the control value U(t).

In this manner, when the cruise control is enabled, the vehicle is controlled to run at the target speed Vd(t) without any stepping of the acceleration pedal 18.

When a resume button (not shown) is depressed, the cruising control restarts such that a speed pattern generator 22 (FIG. 3) generates a speed pattern which is a gradually changing pattern converging to the previously set target speed Vd(t). Based on the generated speed pattern, the speed of the vehicle is gradually changed to and maintained at the final target speed Vd(t). The term "target speed Vd(t)" used herein not only means the final target speed, but also an intermediate target speed such as given by the speed pattern, or a temporary target speed which is set when the resume button is depressed.

Figure 3:
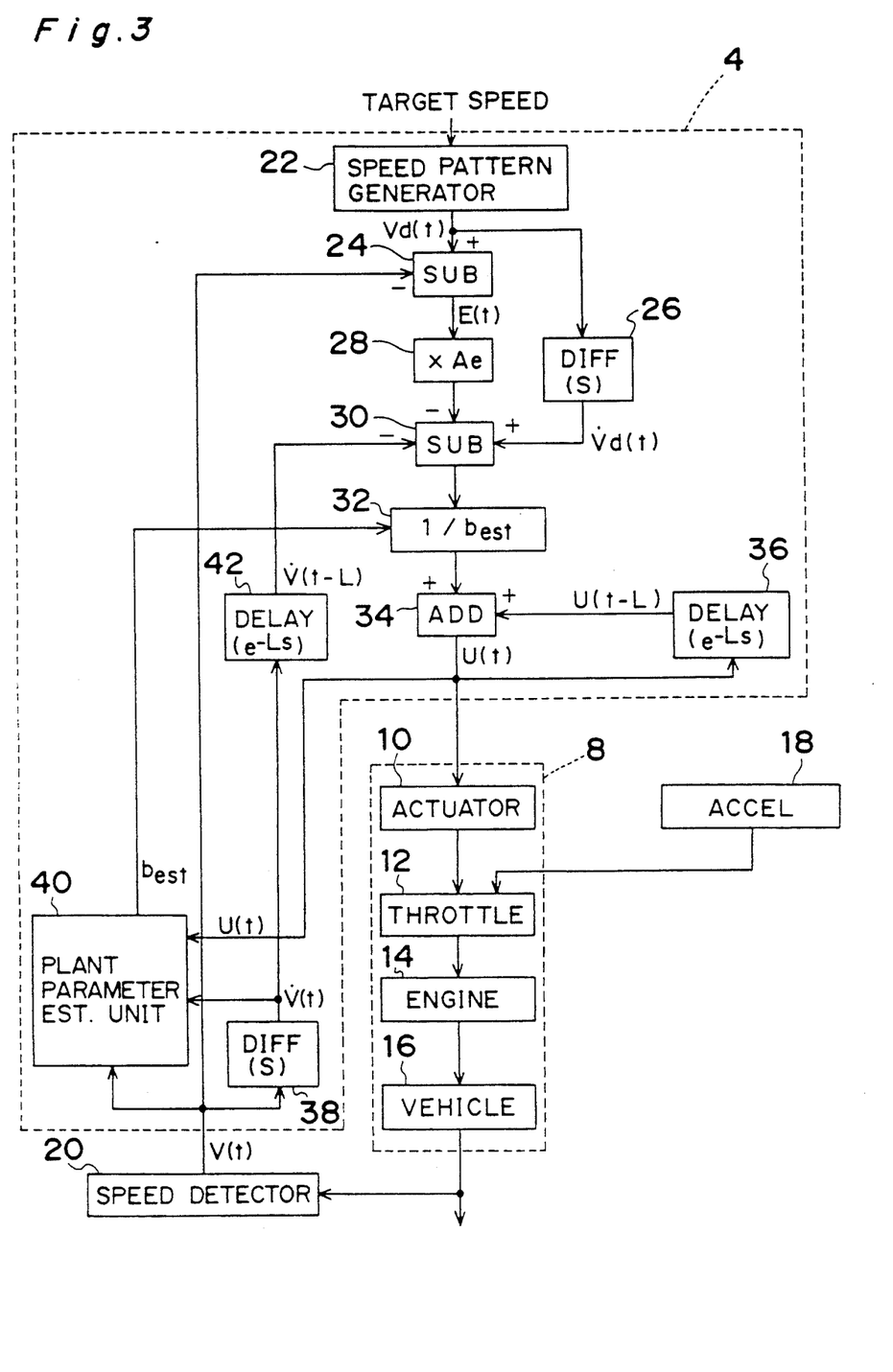
FIG. 3 is a block diagram of a constant speed maintaining apparatus according to a first embodiment of the present invention.

Referring to FIG. 3, a detail of the cruise control 4 according to the first embodiment is shown. The cruise control 4 has a speed pattern generator 22 for generating a predetermined speed pattern when the resume button is depressed to restart the cruising control whereby the vehicle speed gradually increases or decreases to reach the target speed from the present speed, a subtractor 24, a differentiator 26 for producing a differentiated target speed $\dot{V}d(t)$, a multiplier 28, a subtractor 30, a divider 32, an adder 34 for producing a control value U(t), a delay circuit 36 for delaying the control value U(t) by a predetermined amount (one operation cycle) to produce a delayed control value $U(t-L)$, a differentiator 38 for producing a differentiated present speed $\dot{V}(t)$, a plant parameter estimation unit 40 for producing first and second estimated parameters $b_{est}$ and $a_0$, respectively, of the plant 8, and a delay circuit 42 for delaying the differentiated present speed $\dot{V}(t)$ by a predetermined amount (one operation cycle) to produce a delayed differentiated present speed $\dot{V}(t-L)$.

Subtractor 24 calculates a difference E(t) between the present speed V(t) and the target speed Vd(t) and the obtained difference E(t) is multiplied by a predetermined constant Ae. Then, subtractor 30 calculates:

$$\dot{V}d(t) - \dot{V}(t-L) + Ae \cdot E(t).$$

The divider 32 divides the output from the subtractor 30 by a first parameter $b_{est}$ to produce:

$$\{\dot{V}d(t) - \dot{V}(t-L) + Ae \cdot E(t)\}/b$$

and the adder 34 produces the control value U(t) defined as follows:

$$U(t) = U(t-L) + \{\dot{V}d(t) - \dot{V}(t-L) + Ae \cdot E(t)\}/b_{est}. \qquad (I)$$

The above equation is presented in U.S. patent application Ser. No. 07/733,208 of Ishida et al entitled "Auto-Drive Control Apparatus for Use in Vehicle" and filed Jul. 19, 1991 which is assigned to the same assignee as the present application, or in "On Model Reference Control Using Time Delay for Nonlinear Systems with Unknown Dynamics" by K. Youcef-Toumi and O. Ito in M.I.T. Report LMP/RBT 86-06, Jun., 1986, both of these are presented here as a part of the disclosure.

An object to be controlled by cruise control 4 is the plant 8 (actuator 10, throttle mechanism part 12, engine 14 and vehicle body 16). The transfer function is represented by G(s), a control input to the actuator by U(s), and an output vehicle speed by V(s), wherein "s" represents a Laplacean operator. The transfer function G(s) is determined by the frequency response method and a model of the actual application of the system is constructed through identification of the system. The identification is performed by a frequency response method according to the first embodiment. In general, the transfer function is represented by an equation (1) below:

$$V(s)/U(s) = b/(s^n + a_{n-1} \cdot s^{n-1} + \ldots + a_0) \qquad (1)$$

Since it is clear from the identification test of the engine to be controlled that the engine to be controlled can be approximated by a primary delay system represented by a equation (2) below, the first embodiment will be described with reference to an object to be controlled of the primary delay system (n=1):

$$V(s)/U(s) = b/(s + a_0) \qquad (2)$$

When the equation (2) above is expressed in time domain, equation (3) is obtained:

$$\dot{V}(t) + a_0 \cdot V(t) = b \cdot U(t) \qquad (3)$$

At time points $t = t_0$ and $t = t_1$, equations (4) and (5) can be expressed as follows:

$$\dot{V}(t_0) + a_0 \cdot V(t_0) = b \cdot U(t_0) \qquad (4)$$

$$\dot{V}(t_1) + a_0 \cdot V(t_1) = b \cdot U(t_1) \qquad (5)$$

Equations (4) and (5) can be expressed by the following matrix:

$$\begin{bmatrix} -V(t_0) & U(t_0) \\ -V(t_1) & U(t_1) \end{bmatrix} \begin{bmatrix} a_0 \\ b \end{bmatrix} = \begin{bmatrix} \dot{V}(t_0) \\ \dot{V}(t_1) \end{bmatrix} \qquad (6)$$

Equation (6) can be expressed as follows:

$$\begin{bmatrix} a_0 \\ b \end{bmatrix} = \begin{bmatrix} -V(t_0) & U(t_0) \\ -V(t_1) & U(t_1) \end{bmatrix}^{-1} \begin{bmatrix} \dot{V}(t_0) \\ \dot{V}(t_1) \end{bmatrix} \quad (7)$$

From equation (7), $a_0$ and b are obtained as follows:

$$a_0 = \{\dot{V}(t_0) \cdot U(t_1) - \dot{V}(t_1) \cdot U(t_0)\}/\Delta \quad (8)$$

$$b = \{V(t_1) \cdot \dot{V}(t_0) - V(t_0) \cdot \dot{V}(t_1)\}/\Delta \, (=b_{est}) \quad (9)$$

wherein $$\Delta = V(t_1) \cdot U(t_0) - V(t_0) \cdot U(t_1). \quad (10)$$

By equations (8) and (9) parameters $a_0$ and b are calculated in the plant parameter estimation unit 40, and the obtained parameters are produced as $a_0$ and $b_{est}$, respectively.

Figure 4:
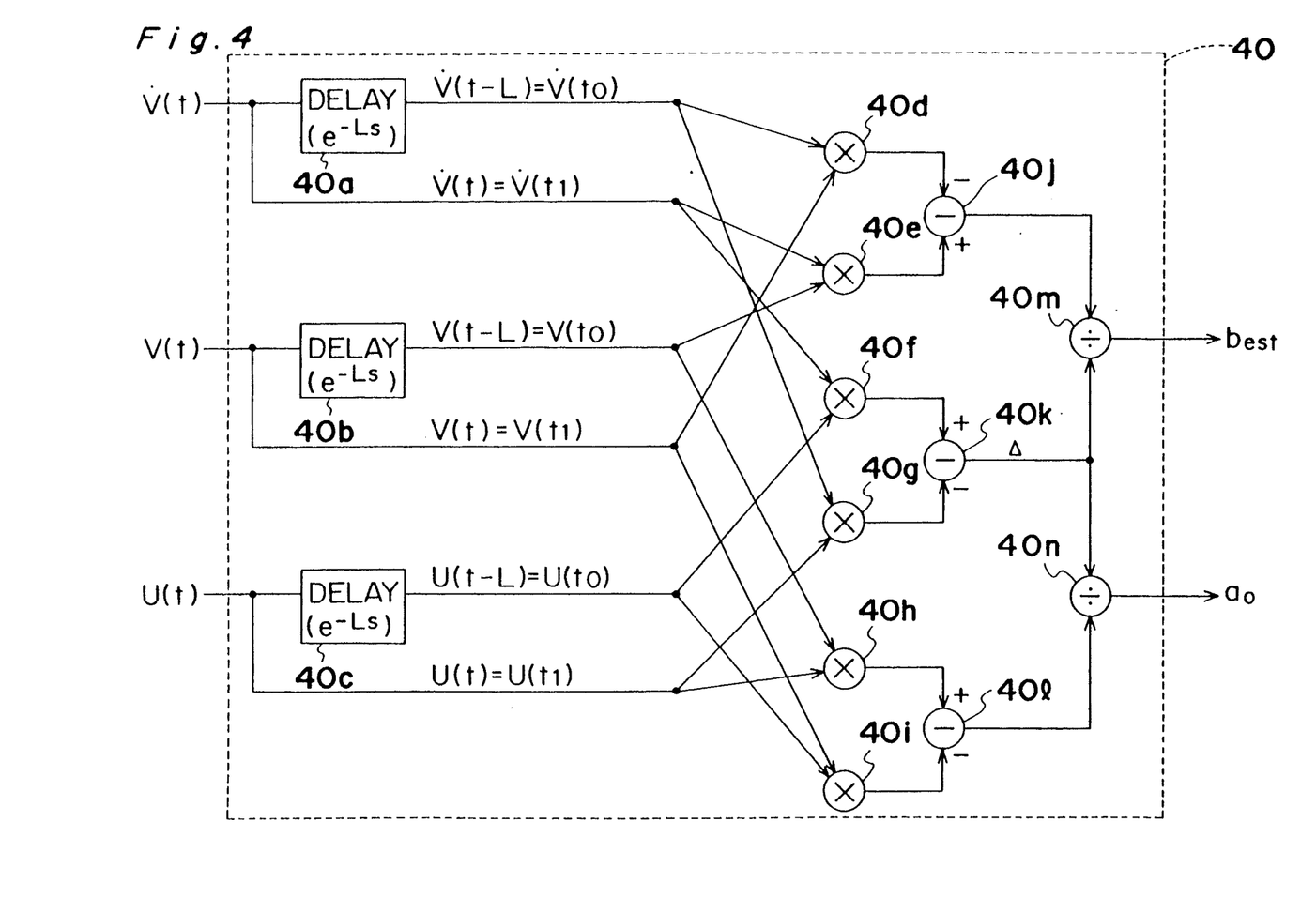
FIG. 4 is a block diagram of a plant parameter estimation unit employed in the circuit of FIG. 3.

Referring to FIG. 4, a detail of the plant parameter estimation unit 40 is shown, which has delay circuits 40a, 40b and 40c each delaying one operation cycle, multipliers 40d, 40e, 40f, 40g, 40h and 40i, subtractors 40j, 40k and 40l and dividers 40m and 40n.

Delay circuit 40a receives differentiated present speed $\dot{V}(t)$ and produces a delayed differentiated present speed $\dot{V}(t-L)$. When $t = t_1$ is considered as the present time and $t = t_0$ is considered as one cycle delayed time, $$\dot{V}(t) = \dot{V}(t_1) \quad (11)$$

$$\dot{V}(t-L) = \dot{V}(t_0) \quad (12)$$

are obtained.

Delay circuit 40b receives present speed V(t) and produces a delayed present speed V(t−L), and the following equations:

$$V(t) = V(t_1) \quad (13)$$

$$V(t-L) = V(t_0) \quad (14)$$

are obtained.

Similarly, delay circuit 40c receives present control value U ( t ) and produces a delayed control value U(t−L), and the following equations:

$$U(t) = U(t_1) \quad (15)$$

$$U(t-L) = U(t_0) \quad (16)$$

are obtained.

By the multipliers 40d and 40e and subtractor 40j, $$\dot{V}(t_1) \cdot V(t_0) - \dot{V}(t_0) \cdot V(t_1) \quad (17)$$

is calculated By the multipliers 40f and 40g and subtractor 40k, $$\Delta = \dot{V}(t_1) \cdot U(t_0) - \dot{V}(t_0) \cdot U(t_1) \quad (18)$$

is calculated. By the multipliers 40h and 40i and subtractor 40l, $$V(t_0) \cdot U(t_1) - V(t_1)^\circ/_{oo} U(t_0) \quad (19)$$

is calculated.

Divider 40m divides the calculated result from subtractor 40j by Δ to produce an estimated parameter $b_{est}$ as defined by equation (9), and divider 40n divides the calculated result from subtractor 40l by Δ to produce a parameter $a_0$ as defined by equation (8).

Referring back to FIG. 3, the parameter $b_{est}$ from the plant parameter estimation unit 40 is applied to divider 32 for use in the calculation of equation (I).

As apparent to those skilled in the art, the parameter $b_{est}$ varies depending on the driving conditions, such as the down slope driving, and the up slope driving, the total weight of the vehicle including the passengers.

Therefore, by the employment of the plant parameter estimation unit 40 in the constant speed maintaining apparatus, the most appropriate control can be given to the plant 8 without any additional tuning in various driving situations. Also, the constant speed maintaining apparatus employing the plant parameter estimation unit 40 can be applied to any type of vehicle without any adjustments of the parameter.

It is to be noted that $b_{est}$ and $a_0$ as calculated from equations (8) and (9) deviate from the true values when a change between $U(t_0)$ and $U(t_1)$ is small due to small change of the differential value of the vehicle speed and thus small change of the control input. In such a case, a switch may be provided between unit 40 and divider 32 for receiving the estimated parameter $b_{est}$ from the plant parameter estimation unit 40 only when an absolute value of the differential value of the vehicle speed $|\dot{V}(t)|$ is larger than a predetermined value, so that the operational error of $b_{est}$ is prevented from becoming large and the estimation accuracy is improved. A similar switch may be provided in the following embodiment to supply the calculated parameter $a_0$ to a calculator 46 only when an absolute value of the differential value of the vehicle speed is larger than a predetermined value.

Figure 5:
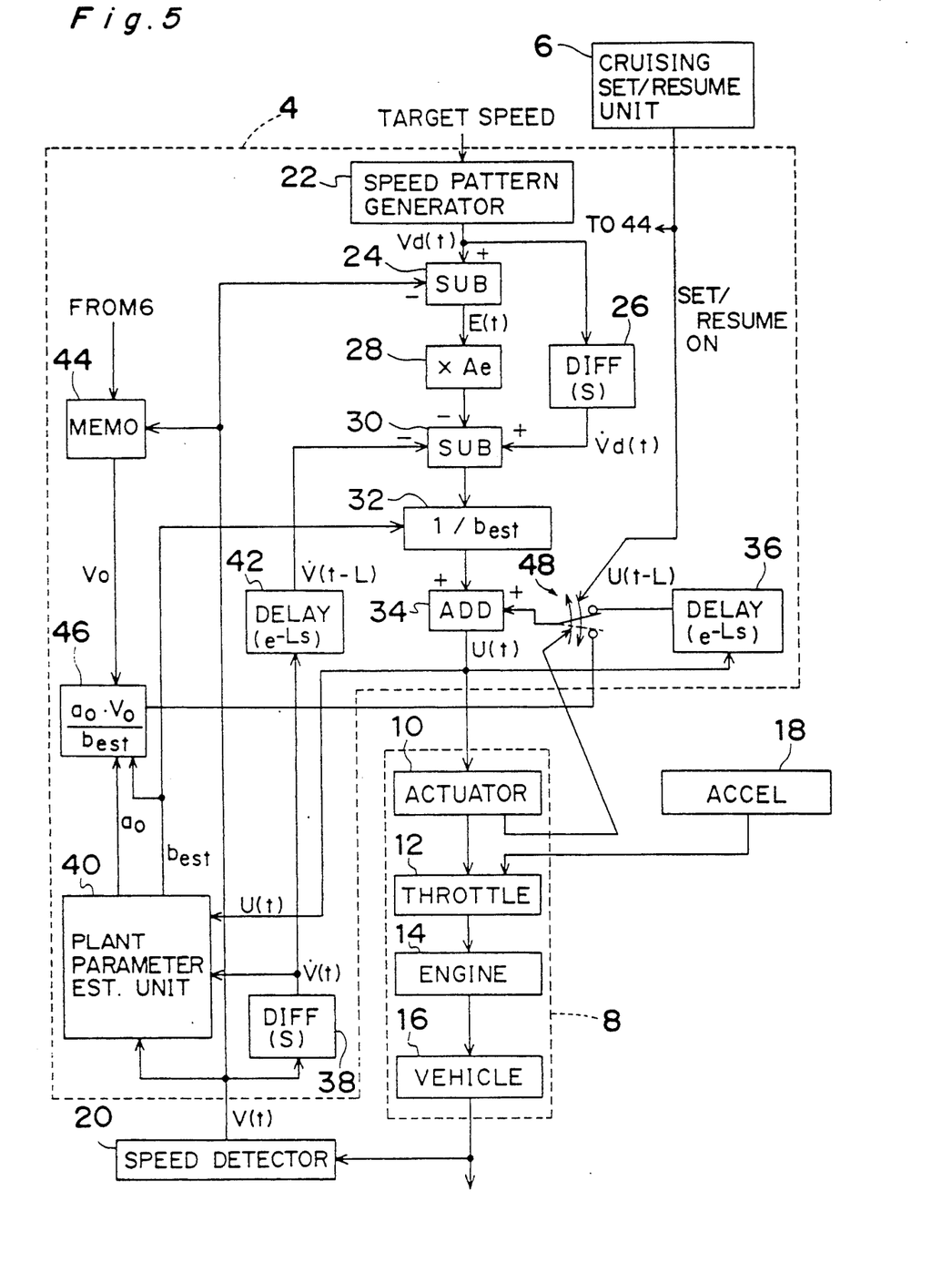
FIG. 5 is a block diagram of a constant speed maintaining apparatus according to a second embodiment of the present invention.

Referring to FIG. 5, a second embodiment of the constant speed maintaining apparatus according to the present invention is shown. When compared with the first embodiment, the second embodiment further has a memory 44 for storing a target vehicle speed $V_0$ at a time when the cruising set button is depressed to start the cruising control, or for storing the target vehicle speed $V_0$ at a time when the cruising resume button is depressed. The apparatus of FIG. 5 further has a calculator 46 and a switch 48. The calculator 46 receives the target vehicle speed $V_0$ and parameters $a_0$ and $b_{est}$ to calculate:

$$a_0 \cdot V_0 / b_{est}. \quad (20)$$

Switch 48 is connected to the adder 34 and is switched between delay circuit 36 and calculator 46. Switch 48 is switched to the calculator 46, as shown by a dotted line, in response to the depression of the cruising set button or cruising resume button to start the cruising control, and is switched to the delay circuit 36 when the actuator 10, which is, e.g., a step motor, is moved to a position to acquire the target vehicle speed $V_0$.

The operation of the second embodiment is further explained with reference to FIG. 6.

When the driver steps on the acceleration pedal 18, the vehicle accelerates to reach a desired speed. Then, when the driver depresses the set button at time Ta, the target vehicle speed $V_0$ is stored, and at the same time, the cruising control starts to turn the throttle 12 by actuator 10. The turning of the throttle 12 by actuator 10 is carried out bit-by-bit in steps after each operation cycle. Therefore, it takes a while before the throttle 12 is turned to a position to acquire the target vehicle speed $V_0$. If the driver releases the acceleration pedal 18 at time Ta, the vehicle slows down due to the delay of the throttle turning by the actuator 10. However, in the second embodiment of FIG. 5, immediately after the start of the cruising control $a_0 \cdot V_0/b_{est}$ is applied to adder 34, instead of U(t−L). Therefore, instead of equation (I), the following equation (II)

$$U(t) = a_0 \cdot V_0/b_{est} + \{\dot{V}d(t) - \dot{V}(t-L) + Ae \cdot E(t)\}/b_{est} \quad (II)$$

is used for controlling the actuator 10 Thus, the actuator 10 moves rapidly by a calculated amount relative to $a_0 \cdot V_0/b_{est}$ to turn the throttle 12 to a degree necessary to acquire the target vehicle speed $V_0$. After the actuator 10 is moved by a calculated amount, switch 48 is turned to a position shown by a solid line to connect the adder 34 with the delay circuit 36.

According to a modification, when switch 48 is turned to a position shown by a dotted line, switch 48 automatically returns to a position shown by a solid line after one cycle operation. According to this modification, adder 34 calculates equation (II) for only one cycle operation, and in the next cycle operation, equation (I) is calculated. Since equation (I) has a term "U((t−L)", which in this case is equal to U(t) obtained by equation (II), the term "$a_0 \cdot V_0/b_{est}$" will be taken in equation (I) once equation (II) is carried out.

Figure 6:
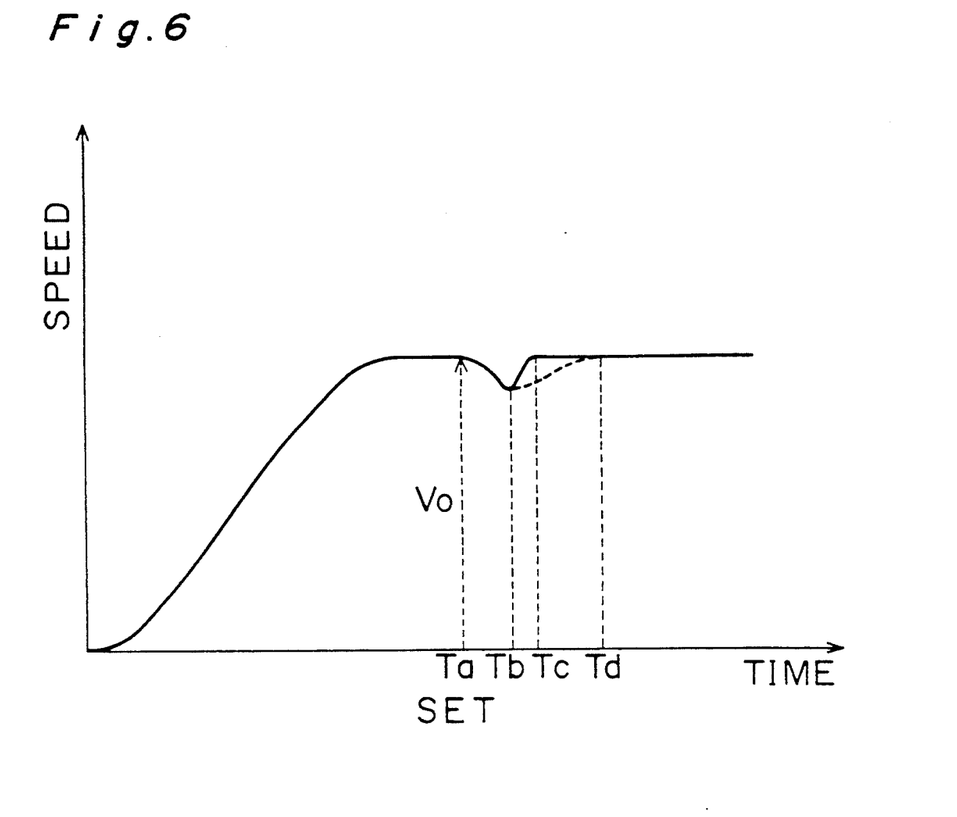
FIG. 6 is a graph showing an operation of the second embodiment of FIG. 5.

According to the second embodiment, the target vehicle speed $V_0$ is acquired in a short time Tb−Tc, as shown by a solid line in FIG. 6. If the actuator 10 moves the throttle bit-by-bit as in the first embodiment, the target vehicle speed $V_0$ is acquired in a longer time Tb−Td, as shown by a dotted line in FIG. 6.

A similar operation is carried out when the resume button is depressed, so that the target vehicle speed $V_0$ can be acquired in a relatively short time.

Figure 7:
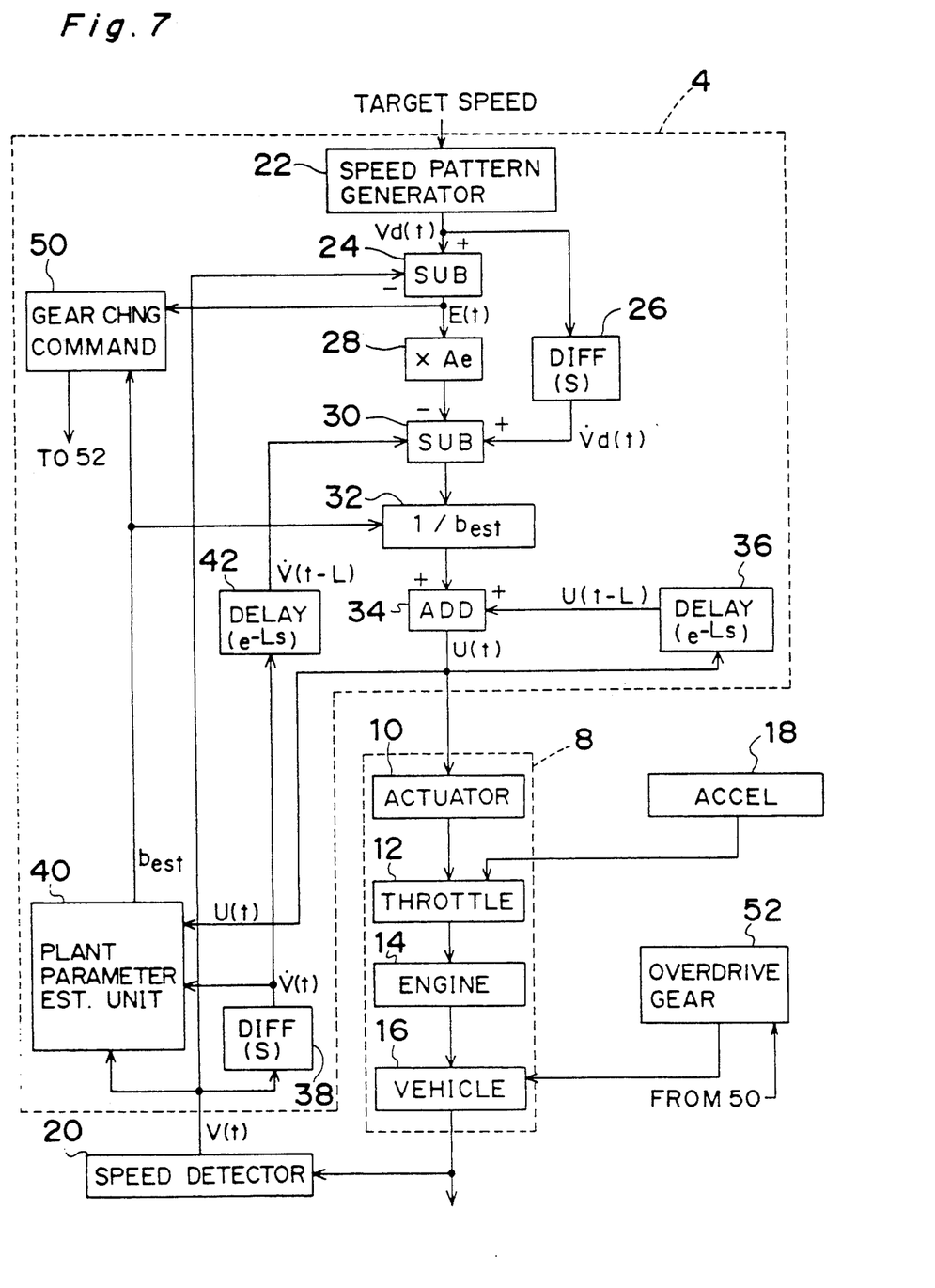
FIG. 7 is a block diagram of a constant speed maintaining apparatus according to a third embodiment of the present invention.

Referring to FIG. 7, a third embodiment of the constant speed maintaining apparatus according to the present invention is shown. When compared with the first embodiment, the third embodiment further has a gear change command generator 50 and an overdrive gear 52 assembled in the transmission. When the overdrive gear 52 is enabled by a manual switch (not shown), the vehicle 16 is set in a condition enable to select the overdrive gear 50, provided that the vehicle is an automatic torque converter type. The gear change command generator 50 receives the parameter $b_{est}$ and difference E(t) and produces an ON signal or OFF signal to change the gear between the overdrive gear and the top gear. The overdrive gear has a gear ratio smaller than the top gear, so that the top gear can produce greater torque than the overdrive gear.

At the beginning, i.e., when the cruise control starts, it is assumed that overdrive gear 52 is enabled and that the gear is in the overdrive gear.

The OFF signal is produced when the parameter $b_{est}$ becomes less than a second threshold $b_{th2}$ ($<b_{th1}$), and at the same time, the difference E(t) becomes greater than the predetermined amount, so as to effect the shift down of the gear from the overdrive gear to the top gear.

Figure 8:
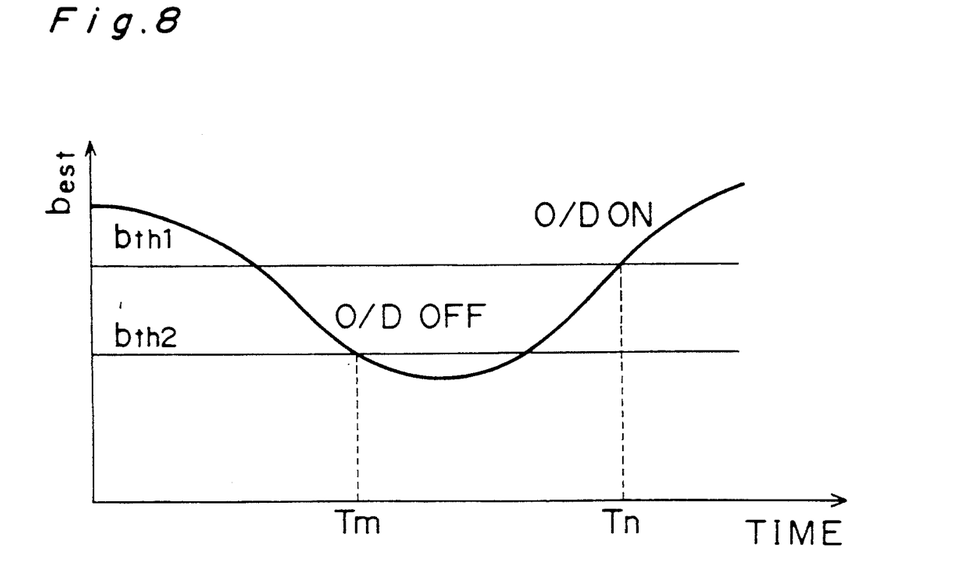
FIG. 8 is a graph showing when the gear change takes place.

The ON signal is produced when the parameter $b_{est}$ becomes greater than a first threshold $b_{th1}$, as shown in FIG. 8, and at the same time, the difference E(t) becomes smaller than a predetermined amount, so as to effect the shift up of the gear from the top gear to the overdrive gear.

In operation, when the vehicle is running on an up slope road, the power necessary to maintain the vehicle speed at the target vehicle speed $V_0$ is increased. In this case, the vehicle shows speed down symptoms, resulting in greater difference E(t). Also, the calculated parameter $b_{est}$ becomes small. In response to these changes, the gear change command generator 50 produces the OFF signal to shift down the gear, e.g., from the overdrive gear to the top gear.

On the other hand, when the vehicle is running on a plain road or a down slope road, the power necessary to maintain the vehicle speed at the target vehicle speed $V_0$ is reduced. In this case, the difference E(t) becomes small and the calculated parameter $b_{est}$ becomes great. Thus, the gear change command generator 50 produces the ON signal to shift up the gear, e.g., from the top gear to the overdrive gear.

As described above, according to the present invention, the parameter $b_{est}$ of the plant 8 to be controlled is estimated in the plant parameter estimation unit 40 using the vehicle speed V(t), differential values of the vehicle speed $\dot{V}(t)$ and control value U(t), so that the calculation of equation (I) can be obtained with a high accuracy.

When the absolute value of the differential value of the vehicle speed is larger than a predetermined value, the estimated parameter $b_{est}$ is used for renewing such a parameter in equation (I). Accordingly, the operational error of the $a_0$ and $b_{est}$ can be prevented from becoming undesirable large, thereby improving the estimation accuracy. Even when the dynamic characteristics of the plant should change, the first embodiment provides a favorable response at all times. Therefore, if the system is applied to a different kind of a vehicle, the tuning time and costs can be reduced, while the controller and actuator can be used in common.

According to the second embodiment, the initial control value U(0) for use immediately after the depression of the set button or the resume button is obtained by equation (20). Therefore, the temporary speed down of the vehicle caused, e.g., by the loosening or play of the wire of the throttle mechanism after the release of the acceleration pedal is prevented. As result, the vehicle speed will be quickly increased to the target speed.

According to the third embodiment, the timing to turn on or turn off the overdrive is determined by the estimated parameter $b_{est}$ and the speed difference E(t), and therefore the overdrive is controlled, e.g., correspondingly to the inclination of the road. Accordingly, the vehicle speed can be maintained closer to the target speed.

Although the present invention has been fully described in connection with the preferred embodiments thereof with reference to the accompanying drawings, it is to be noted that various changes and modifications are apparent to those skilled in the art. Such changes and modifications are to be 10 understood as included within the scope of the present invention as defined by the appended claims unless they depart therefrom.

What is claimed is:

1. A constant speed maintaining apparatus for use in a vehicle comprising:
   a vehicle speed detecting means for detecting a present speed V(t) of the vehicle;
   a cruise control means for producing a control value U(t);

a target speed setting means for setting a target speed VD(t); and an actuator for changing the opening degree of a throttle valve of a vehicle engine based on the control value U(t) to maintain the present speed V(t) substantially equal to said target speed VD(t);

said cruise control means comprising:

a differentiation means for calculating a differentiated present speed $\dot{V}(t)$;

a parameter estimation means for calculating an estimated parameter $b_{est}$ based on said present speed V(t), differentiated present speed $\dot{V}(t)$, and control value U(t); and a control value calculation means for calculating said control value based on said target speed VD(t), present speed V(t), differentiated present speed $\dot{V}(t)$, and estimated parameter $B_{est}$, in which $B_{est}$ represents an estimated parameter of an input characteristic b in a transfer function given by:

$$V(s)/U(s) = b/(s^n + a_{n-1} \cdot s^{n-1} + \ldots + a_0)$$

wherein U(s) is a control input to an actuator, V(s) is an output vehicle speed, a is a parameter, and s represents a Laplacean operator.

2. A constant speed maintaining apparatus as claimed in claim 1, wherein said parameter estimation means carries out the following calculation to produce said estimated parameter $B_{est}$:

$$b_{est} = \{V(t_1) \cdot \dot{V}(t_0) - V(t_0) \cdot \dot{V}(t_1)\}/\Delta$$

$$\Delta = V(t_1) \cdot U(t_0) - V(t_0) \cdot U(t_1)$$

wherein V(t$_1$), and $\dot{V}(t_1)$ and U(t$_1$) are the values obtained in the present operation cycle and V(t$_0$), $\dot{V}(t_0)$ and U(t$_0$) are the values obtained in the previous operation cycle.

3. A constant speed maintaining apparatus as claimed in claim 1, wherein said control value calculation means carries out the following calculation(I) to produce said control value U(t):

$$U(t) = U(t-L) + \{\dot{V}d(t) - \dot{V}(t-L) + Ae \cdot E(t)\}/b_{est} \quad (I)$$

wherein Ae is a predetermined constant, E(t) is a difference between the present speed V(t) and the target speed Vd(t), and L is a predetermined period of time.

4. A constant speed maintaining apparatus as claimed in claim 3, wherein said parameter estimation means further calculates an estimated parameter a$_0$ based on said present speed $\dot{V}(t)$, differentiated present speed $\dot{V}(t)$, and control value U(t) in accordance with equations:

$$a_0 = \{\dot{V}(t_0) \cdot U(t_1) - \dot{V}(t_1) \cdot U(t_0)\}/\Delta$$

$$\Delta = \dot{V}(t_1) \cdot U(t_0) - \dot{V}(t_0) \cdot U(t_1)$$

wherein V(t$_1$), $\dot{V}(t_1)$ and U(t$_1$) are the values obtained in the present operation cycle and V(t$_0$), $\dot{V}(t_0)$ and U(t$_0$) are the values obtained in the previous operation cycle.

5. A constant speed maintaining apparatus as claimed in claim 4, further comprising:

an initial speed memory means for storing an initial speed V$_0$ at a time when said cruise control means is activated;

an initial value calculation means for calculating an initial value which is in relation to $a_0 \cdot V_0 / b_{est}$;

a switch means for switching said control value calculation means to carry out the following calculation (II)

$$U(t) = a_0 \cdot V_0 / b_{est} + \{\dot{V}d(t) - \dot{V}(t-L) + Ae \cdot E(t)\}/b_{est} \quad (II)$$

when said cruise control means is activated to quickly open said throttle, and to carry out said calculation (I) after said throttle is opened to a degree relative to $a_0 \cdot V_0 / b_{est}$.

6. A constant speed maintaining apparatus as claimed in claim 4, further comprising:

an initial speed memory means for storing an initial speed V$_0$ at a time when said cruise control means is activated;

an initial value calculation means for calculating an initial value which is in relation to $a \cdot V_0 / b_{est}$;

a switch means for switching said control value calculation means to carry out the following calculation (II)

$$U(t) = a_0 \cdot V_0 / b_{est} + \{\dot{V}d(t) - \dot{V}(t-L) + Ae \cdot E(t)\}/b_{est} \quad (II)$$

for one cycle operation when said cruise control means is activated to substitute calculation (I) to quickly open said throttle.

7. A constant speed maintaining apparatus as claimed in claim 1, further comprising:

an overdrive gear provided in association with a gear transmission of a vehicle and having a gear ratio smaller than a top gear;

a gear change command means for commanding gear change from the top gear to the overdrive gear when the parameter $b_{est}$ becomes greater than a first threshold and for commanding gear change from the overdrive gear to the top gear when the parameter $b_{est}$ becomes less than a second threshold, wherein said parameter estimation means calculates the parameter $b_{est}$ in every control cycle of said cruise control.

8. A constant speed maintaining apparatus for use in a vehicle comprising:

a vehicle speed detecting means for detecting a present speed V(t) of the vehicle;

a cruise control means for producing a control valve U(t);

a target speed setting means for setting a target speed Vd(t); and an actuator for changing the opening degree of a throttle valve of a vehicle engine based on the control value U(t) to maintain the present speed V(t) substantially equal to said target speed Vd(t);

said cruise control means comprising:

a differentiation means for calculating a differentiated present speed $\dot{V}(t)$;

a parameter estimation means for calculating an estimated parameter $b_{est}$ based on said present speed V(t), differentiated present speed $\dot{V}(t)$, and control value U(t); and a control value calculation means for calculating said control value based on said target speed Vd(t), present speed V(t), differentiated present speed $\dot{V}(t)$, and estimated parameters $b_{est}$;

wherein said parameter estimation means carries out the following calculation to produce said estimated parameter $b_{est}$:

$$b_{est} = \{V(t_1) \cdot \dot{V}(t_0) - V(t_0) \cdot \dot{V}(t_1)\}/\Delta$$

$$\Delta = V(t_1) \cdot U(t_0) - V(t_0) \cdot U(t_1)$$

wherein $V(t_1)$, $\dot{V}(t_1)$ and $U(t_1)$ are the values obtained in the present operation cycle and $V(t_0)$, $\dot{V}(t_0)$, and $U(T_0)$ are the values obtained in the previous operation cycle.

9. A constant speed maintaining apparatus for use in a vehicle comprising:
   a vehicle speed detecting means for detecting a present speed $V(t)$ of the vehicle;
   a cruise control means for producing a control value $U(t)$;
   a target speed setting means for setting a target speed $Vd(t)$; and
   an actuator for changing the opening degree of a throttle valve of a vehicle engine based on the control value $U(t)$ to maintain the present speed $V(t)$ substantially equal to said target speed $Vd(t)$;
   said cruise control means comprising:
      a differentiation means for calculating a differentiated present speed $\dot{V}(t)$;
      a parameter estimation means for calculating an estimated parameter $b_{est}$ based on said present speed $V(t)$, differentiated present speed $\dot{V}(t)$, and control value $U(t)$; and
      a control value calculation means for calculating said control value based on said target speed $Vd(t)$, present speed $V(t)$, differentiated present speed $\dot{V}(t)$, and estimated parameters $B_{est}$;
   wherein said control value calculation means carries out the following calculation (I) to produce said control value $U(t)$;

$$U(t) = U(t-L) + \{\dot{V}d(t) - \dot{V}(t-L) + Ae \cdot E(t)\}/b_{est} \quad (I)$$

wherein $Ae$ is a predetermined constant, $E(t)$ is a difference between the present speed $V(t)$ and the target speed $Vd(t)$, and $L$ is a predetermined period of time.

10. A constant speed maintaining apparatus as claimed in claim 9, wherein said parameter estimation means further calculates an estimated parameter $a_0$ based on said present speed $V(t)$, differentiated present speed $\dot{V}(t)$, and control value $U(t)$.

11. A constant speed maintaining apparatus as claimed in claim 10, further comprising:
   an initial speed memory means for storing an initial speed $V_0$ at a time when said cruise control means is activated;
   an initial value calculation means for calculating an initial value which is in relation to $A_0 \cdot V_0/b_{est}$;
   a switch means for switching said control value calculation means to carry out the following calculation (II)

$$U(t) = a_0 \cdot V_0/b_{est} + \{\dot{V}d(t) - \dot{V}(t-L) + Ae \cdot E(t)\}/b_{est} \quad (II)$$

when said cruise control mans is activated to quickly open said throttle, and to carry out said calculation (I) after said throttle is opened to a degree relative to $a_0 \cdot V_0/b_{est}$.

12. A constant speed maintaining apparatus as claimed in claim 10, further comprising:
   an initial speed memory means for storing an initial speed $V_0$ at a time when said cruise control means is activated;
   an initial value calculation means for calculating an initial value which is in relation to $a_0 \cdot V_0/b_{est}$;
   a switch means for switching said control value calculations means to carry out the following calculation (II)

$$U(t) = a_0 \cdot V_0/b_{est} + \{\dot{V}d(t) - \dot{V}(t-L) + Ae \cdot E(t)\}/b_{est} \quad (II)$$

for one cycle operation when said cruise control means is activated to substitute calculation (I) to quickly open said throttle.

* * * * *